United States Patent [19]

Kramer

[11] 4,163,513

[45] Aug. 7, 1979

[54] MOTORCYCLE SADDLEBOX

[76] Inventor: Ralph Kramer, 2628 Powhattan Pkwy., Toledo, Ohio 43606

[21] Appl. No.: 797,507

[22] Filed: May 16, 1977

[51] Int. Cl.² ............................................. B62J 9/00
[52] U.S. Cl. ............................... 224/32 R; 224/32 A; 280/289 A
[58] Field of Search ...................... 224/30 R, 31, 32 R, 224/32 A, 39, 43, 44, 42.03 A, 35; D12/158; 280/202, 289 A

[56] References Cited

U.S. PATENT DOCUMENTS

| | | | |
|---|---|---|---|
| D. 237,167 | 10/1975 | Hanes | D12/158 |
| D. 244,927 | 7/1977 | Anthon | D12/158 |
| 672,495 | 4/1901 | Smith | 224/32 A |
| 2,783,927 | 3/1957 | Harley | 224/32 R |
| 3,228,576 | 1/1966 | Gaukel | 224/42.03 A |
| 3,795,354 | 3/1974 | Stippich | 224/32 A |
| 3,963,158 | 6/1976 | Clenet | 224/32 A X |
| 4,050,615 | 9/1977 | Kline | 224/32 A |

FOREIGN PATENT DOCUMENTS 44616 6/1961 Poland ...................................... 280/202
25334 of 1898 United Kingdom .................. 224/32 A

*Primary Examiner*—Trygve M. Blix
*Assistant Examiner*—Winston H. Douglas
*Attorney, Agent, or Firm*—Barker, Emch, Schaffer & Todd Co.

[57] ABSTRACT

A saddlebox for motorcycles and the like is disclosed which comprises a single unit positioned over the rear wheel and defining a continuous storage area at the rear, top and sides of the wheel. The saddlebox incorporates the rear lights, the license plate, and sidelights, and eliminates the cumbersomeness, the waste of space, and the excessive chrome framework of multiple storage units. It is designed to be securely installed to the existing framework of the cycle which eliminates a time-consuming and costly conversion.

2 Claims, 6 Drawing Figures

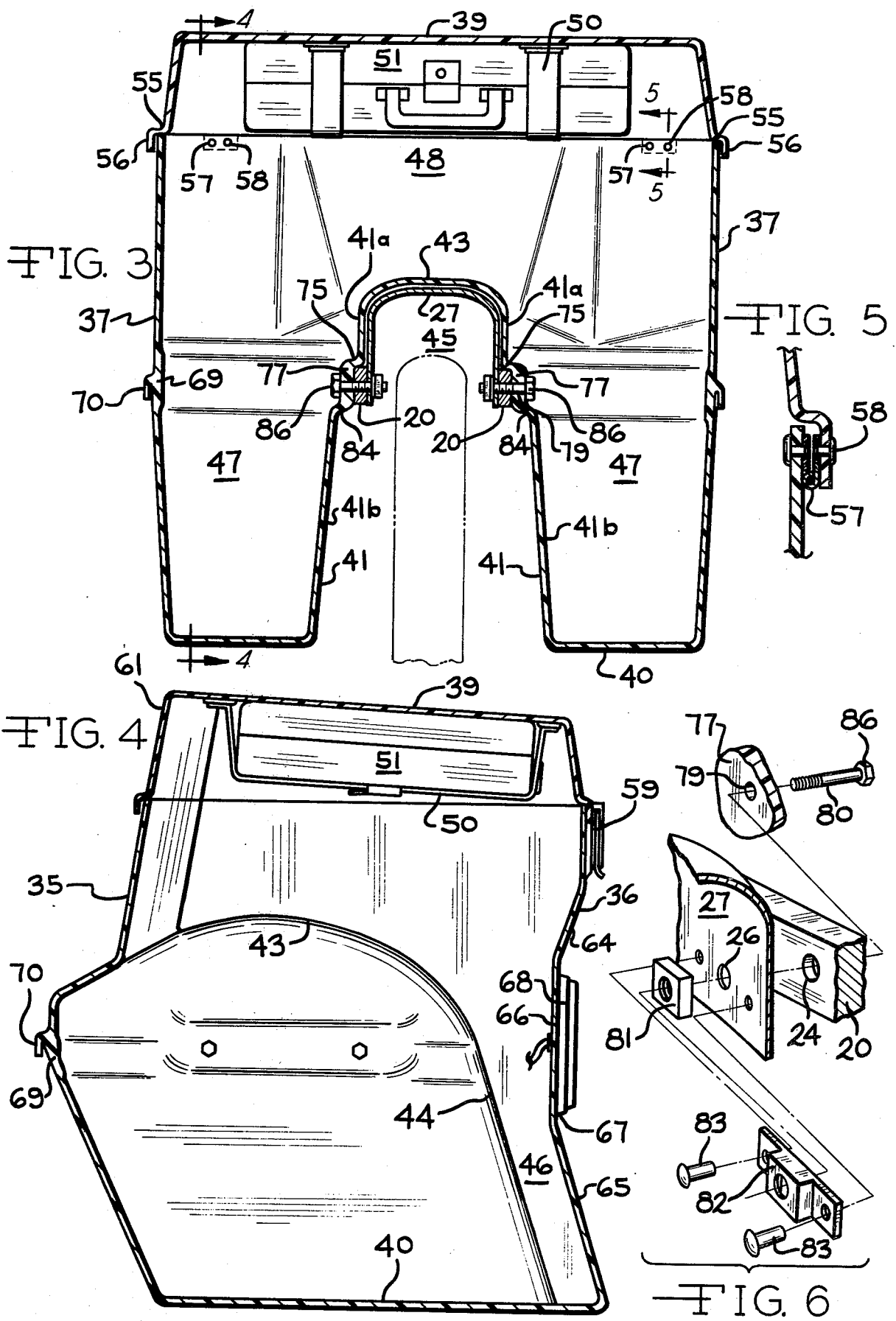

MOTORCYCLE SADDLEBOX

BACKGROUND OF THE INVENTION

The present invention relates to cargo-carrying accessories for motorcycles and the like, and more specifically to rigid tote boxes or saddlebags, and may be conveniently called a saddlebox. Such equipment is quite popular among touring motorcyclists, but presently available models suffer from several handicaps.

Soft-side saddlebags have been used for years by cyclists. However, they are not spacious, are not theft-proof, and cannot be shaped for aerodynamic efficiency. Accordingly, hard-sided containers are preferred by many cyclists and are currently marketed in a variety of shapes and sizes to fit the needs of the user.

One of the disadvantages of contemporary luggage-bearing accouterment is its lack of adequate storage area. Presently, in order to acquire sufficient storage capacity, one must assemble several units of suitcases or tote boxes on a complex frame or set of frames around the back of the motorcycle. However, such an assemblage is unwieldy and does not make use of the space available between the units. Also, the several items, which are generally intended for removal from the cycle during their use, are directly exposed to the environment and are thereby unprotected from abrasion and impact damage and natural wear from the elements.

The complex framework and assemblage of luggage units, the display of segregated rear tail, stop, and directional lights and the license plate, and the flamboyant appearance of the motorcycle chrome all result in an ostentatious and complex exhibit which is objectionable to the user who prefers a simpler attachment.

SUMMARY OF THE INVENTION

The present invention provides a lightweight, spacious, rigid saddlebox which incorporates the rear lighting equipment and license plate, and elminates the necessity for excessive framework or specially adapted fittings for a retrofit. The saddlebox comprises one unit which fits over the rear wheel, and secures to an existing rigid frame to define a continuous storage area surrounding the rear, top, and sides of the wheel. The storage area is large enough to hold small suitcases or bags, thus protecting them from damage and wear, in addition to loose small items. It is protected by a single hinged top or cover which can be locked shut to secure the contents against unauthorized access.

Since the saddlebox is not intended as a removable piece of luggage itself, rear lighting fixtures are attached in a recess on the back wall of the saddlebox, thus eliminating the need for separate units and protecting them from impacts against planar surfaces. Additionally, the license plate may be affixed adjacent to the back wall so as to be conspicuous but not projecting. Furthermore, the front wall of the saddlebox may be recessed to conform to the passenger seat and to serve as a bucket seat type backrest, without the need of installing a separate accessory.

Thus, it is an object of this invention to provide a saddlebox for motorcycles and the like which has the aforementioned advantages of being adaptable to an existing motorcycle frame.

It is also an object of this invention to provide a saddlebox which is spacious.

It is further an object of this invention to provide a saddlebox is which is protect both hard and soft luggage from damage and wear due to exposure to the environment.

It is still further an object of this invention to provide a saddlebox which incorporates various cycle accessories in a compact and unpretentious manner.

Other objects and advantages of the invention will be apparent to those skilled in the art from the following detailed description of the invention, with reference made to the drawings.

BRIEF DESCRIPTION OF THE DRAWINGS

FIG. 3 is a cross-sectional view along the line 3—3 of FIG. 1;

FIG. 4 is a cross-sectional veiw along the line 4—4 of FIG. 3;

FIG. 5 is a cross-sectional view along the line 5—5 of FIG. 3; and

FIG. 6 illustrates the assembly of the saddlebox to the frame and rear wheel fender.

DETAILED DESCRIPTION OF THE DRAWINGS

Figure 1:
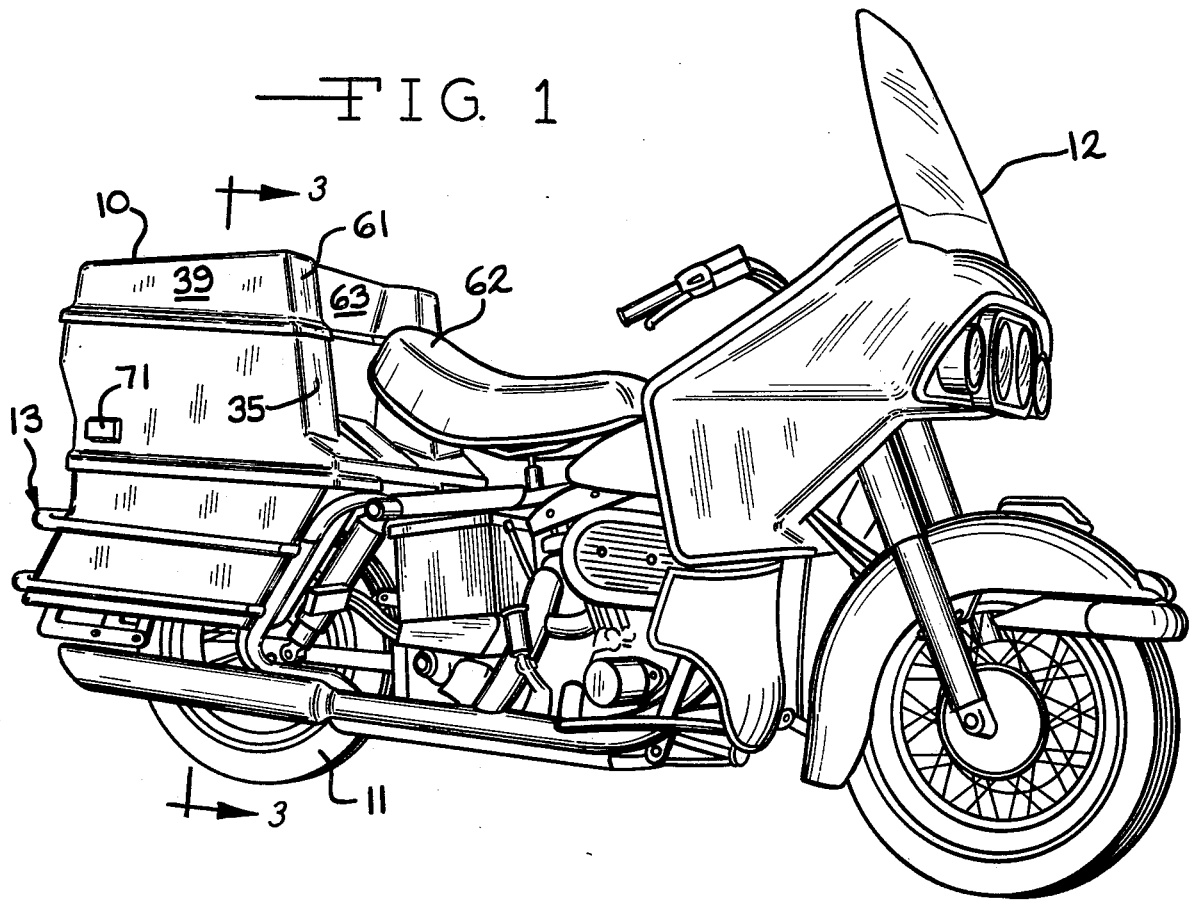
FIG. 1 is an overall perspective view of a preferred embodiment of the present invention assembled on a motorcycle.

As illustrated in FIG. 1, the saddlebox 10, preferably made from molded glas-reinforced plastic but conceivably fabricated from wood or sheet metal, comprises a single unit which is positioned over the rear wheel 11 of a motorcycle 12. The saddlebox 10 is secured to the motorcycle 12 by means of an existing rigid framework on the cycle itself, and may be surrounded by an outer frame generally indicated by reference numberal 13. In the following description, the framework 13 is shown which is similar to a number of commercially sold cycles such as the Electroglide model made by Harley-Davidson division of AMF, Inc.

Figure 2:
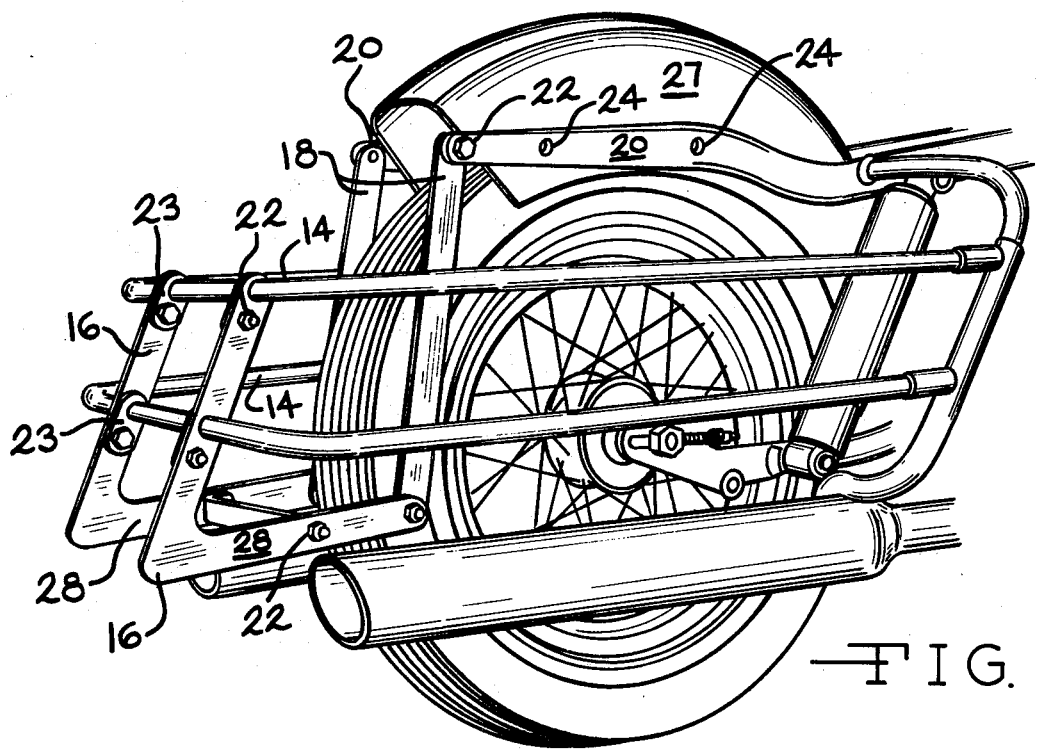
FIG. 2 is a perspective view of the rigid framework to which the saddlebox of the present invention is secured.

The cycle framework 13 is shown in greater detail in FIG. 2. It includes horizontal retaining bars 14, generally L-shaped structural support brackets 16, vertical members 18, and main saddlebox support frames 20 assembled with fastening means 22 and clamps 23. The main support frames 20 have holes 24 drilled therethrough and aligned with adjacent holes 26 in the rear wheel fender 27 for assembly purposes with the saddlebox 10 as explained below. The bulk of the support for the saddlebox 10 is supplied by the main support frames 20; whereas, the retaining bars 14, the horizontal segments 28 of the L-shaped brackets 16, and vertical members 18 serve to prevent pendular or extreme lateral motion of the saddlebox 10 thereabout.

FIGS. 3 and 4 best illustrate the physical shape of the saddlebox 10. The saddlebox 10 is defined generally by front wall 35, rear wall 36, outermost side walls 37, cover 39, and bottom plate 40. A pair of inner side walls 41 extend upwardly from the bottom plate 40, with a top ceiling 43 and an interior rear wall 44 completing the boundary of a wheel well 45. The saddlebox 10 encloses and defines a rear, side and top storage area 46, 47 and 48, respectively, for enclosing either loose items or hard suitcases. For example, strapping means 50 is shown in FIGS. 3 and 4 for confining a suitcase 51 within cover 39. Other suitable attachment means could be used to position the suitcase 51 within the cover or in any other desirable position.

Cover 39 rest on the remainder of the saddlebox 10 by means of shoulder 55, coextensive with a skirt 56 which prevents penetration of the interior by rain. The cover 39 is secured to the saddlebox 10 by means of hinges 57 (see FIG. 5), fasteners 58 and lock 59. The cover, being a separate molding from the remainder of the saddlebox, could be fabricated in a contrasting color if desired.

The front wall 35, best illustrated in FIG. 1, and front side 61 of the cover 39, is recessed to provide room for the passenger seat 62 and a bucket seat type backrest. In some cases, recess 63 in the front side 61 of cover 39 is a necessary feature to allow complete opening of the cover 39 without interference from the seat 62.

The rear wall 36 of the lower portion of the box includes inclining segments 64 and 65, and vertical section 66 which forms a recess 67. Rear tail, stop and directional lights 68 are affixed to the vertical section 66 within recess 67, eliminating the need for separate mounting means and providing protection to the lights 68 from damage due to impacts against planar surfaces. Electrical connections and wires are fed within the box interior to a junction or ganged plug which most conveniently can be positioned within the front wall 35 where it is concealed from view by the motorcycle seat. Inclined segement 65 additionally furnishes a convenient surface against which to display the license plate (not shown), therefore disposing of the requirement for a segregate mounting bracket.

The lower box is conveniently molded from two separate parts which are adhesively joined in a horizontal seam to create a band 69 of extra thickness. This band 69 extends about front and outermost side walls 35 and 37, respectively, and part of rear wall 36 at a horizontal plane approximately halfway up from the bottom plate 40 to assure rigidity of the entire structure. A lip 70 immediately adjacent band 69 cooperates with skirt 56 on cover 39 to offer bumper protection to the main areas of the walls and to side reflectors 71 (one shown in FIG. 1).

As mentioned above, the saddlebox 10 is chiefly supported by main support frames 20. Details of the support assembly are shown in FIGS. 3 and 6. The innermost side walls 41 include horizontal elongate support surfaces 75 protruding therefrom and spaced opposite each other to provide upper and lowerr portions of the innermost side walls 41a and 41b, respectively. Vertical structure members 77 which depend from and are coextensive with the support surfaces 75 bottom outwardly to join with the lower portions 41b of the innermost side walls 41. The support surfaces 75 and vertical structure members 77 are both substantially thicker than the remaining portions of innermost side walls 41 to provide an extra rigid structure support. Holes 79 are drilled through vertical structure members 77 and aligned with immediately adjacent holes 24 and 26 in main support frames 20 and rear wheel fender 27.

The saddlebox 10 is then positioned over the rear wheel fender 27 such that support surfaces 75 rest on main support frames 20. A bolt 80 is then inserted through holes 79, 24 and 26, nut 81, and a nut retainer 82 to securely fasten the saddlebox 10 to the rear wheel fender 27 and main support frames 20. Fasteners 83 permanently attach the nut retainer 82 to the fender 27, thereby preventing rotational movement of the nut 81. Vertical structure members 77 and bottoms 84 conveniently form a recess in which to position bolt head 86, keeping the bolt head 86 from annoyingly interfering with luggage in side storage areas 47. As thus described, the entire weight of the saddlebox 10 rests upon the rigid frame members 20, with the bolts 80 or other suitable fasteners used primarily to keep the box 10 in place, and not primarily for support purposes. This reduces the necessity for cumbersome and heavy fasteners and built-in reinforcing means which would be necessary if the fasteners 80 themselves were the primary support. In addition, the support surfaces 75 and vertical structure 77 provide additional rigidity to the entire structure to resist against torsion or flexure when an uneven load is placed on the box, along with the band 69 as previously described.

Although the embodiment above and its novel advantages have been described in greatest detail, it should be clear that various other advantages of the present invention will be apparent to those skilled in the art and various modifications may be made without departing from the scope and spirit of the attached claims.

What I claim is:

1. A saddlebox for motorcycles and the like; said saddlebox comprising a rigid, hollow container including outermost front, rear and side walls joined at their intersections to provide a closed outermost periphery and a bottom plate intersecting and joined to said walls; a pair of spaced apart innermost side walls extending upwardly from said bottom plate and inwardly from said front wall to define a wheel well extending into said box; said wheel well having an interior top well ceiling extending between said innermost side walls and interior rear well wall extending between said innermost side walls from said top well ceiling downwardly to said bottom plate to form a closed lower surface of said box; each of said innermost side walls including a generally horizontal elongate support surface protruding therefrom and spaced opposite each other to form upper and lower portions of said innermost side walls; said protruding support surfaces being adapted to rest upon rigid horizontal frame members of said cycle when said saddle box is positioned thereon, with the rigid frame members and cycle wheel extending into said wheel well of said box; a substantially vertical structure member depending from and coextensive with each of said horizontal support surfaces and disposed substantially perpendicular thereto and bottoming outwardly from said wheel well to join with said lower portions of each of said innermost side walls; said vertical structure members having holes therethrough adapted to receive fastening means extending through said rigid frame members and said holes; and said horizontal support surfaces and vertical structure members being substantially thicker than the rest of said saddlebox to provide reinforcing structural support.

2. A saddle box, as defined in claim 1, including a rigid reinforcing band extending about said closed outermost periphery substantially in the middle of said outermost walls.

* * * * *